(12) United States Patent
Matsui

(10) Patent No.: US 7,760,460 B2
(45) Date of Patent: Jul. 20, 2010

(54) HEAD INTEGRATED CIRCUIT AND STORAGE APPARATUS INCLUDING THE SAME

(75) Inventor: Junko Matsui, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 240 days.

(21) Appl. No.: 12/124,851

(22) Filed: May 21, 2008

(65) Prior Publication Data

US 2008/0316633 A1 Dec. 25, 2008

(30) Foreign Application Priority Data

Jun. 19, 2007 (JP) ............... 2007-161794

(51) Int. Cl.
*G11B 5/60* (2006.01)
(52) U.S. Cl. ..................................... 360/75
(58) Field of Classification Search ............ None
See application file for complete search history.

(56) References Cited

U.S. PATENT DOCUMENTS

| 6,798,598 | B2  | 9/2004  | Suzuki et al. |         |
|-----------|-----|---------|---------------|---------|
| 7,023,647 | B2* | 4/2006  | Bloodworth et al. | 360/75 |
| 7,119,990 | B2  | 10/2006 | Bajorek et al. |        |
| 7,477,470 | B2* | 1/2009  | Leis et al.   | 360/75  |

| 2003/0213794 | A1  | 11/2003 | Krieger et al. |         |
|--------------|-----|---------|----------------|---------|
| 2005/0057841 | A1  | 3/2005  | Stover et al.  |         |
| 2008/0298197 | A1* | 12/2008 | Cheng et al.   | 369/59.2 |

FOREIGN PATENT DOCUMENTS

| JP | A 5-20635      | 1/1993  |
|----|----------------|---------|
| JP | A 2003-68424   | 3/2003  |
| JP | A 2004-241105  | 8/2004  |
| JP | A 2004-281012  | 10/2004 |
| JP | A 2004-342151  | 12/2004 |
| JP | A 2005-347213  | 12/2005 |
| JP | A 2007-26565   | 2/2007  |
| KR | 10-2006-0075126 | 7/2006 |

* cited by examiner

*Primary Examiner*—Hoa T Nguyen
*Assistant Examiner*—James L Habermehl
(74) *Attorney, Agent, or Firm*—Greer, Burns & Crain, Ltd.

(57) ABSTRACT

A head integrated circuit for driving a head. The head includes at least a head unit and a heating element for adjusting the spacing between the head and a storage medium. The head integrated circuit includes at least a read amplifier for amplifying the read signal from the head unit and a heater drive circuit for driving the heating element. The heater drive circuit includes a measuring circuit configured to measure the level of power supplied to the heating element, an error calculating circuit configured to calculate an error between a predetermined power level and the measured power level, a pulse width modulation circuit configured to modulate the error into a pulse width, and a switch configured to operate in response to a pulse from the pulse width modulation circuit and supply power to the heating element.

20 Claims, 10 Drawing Sheets

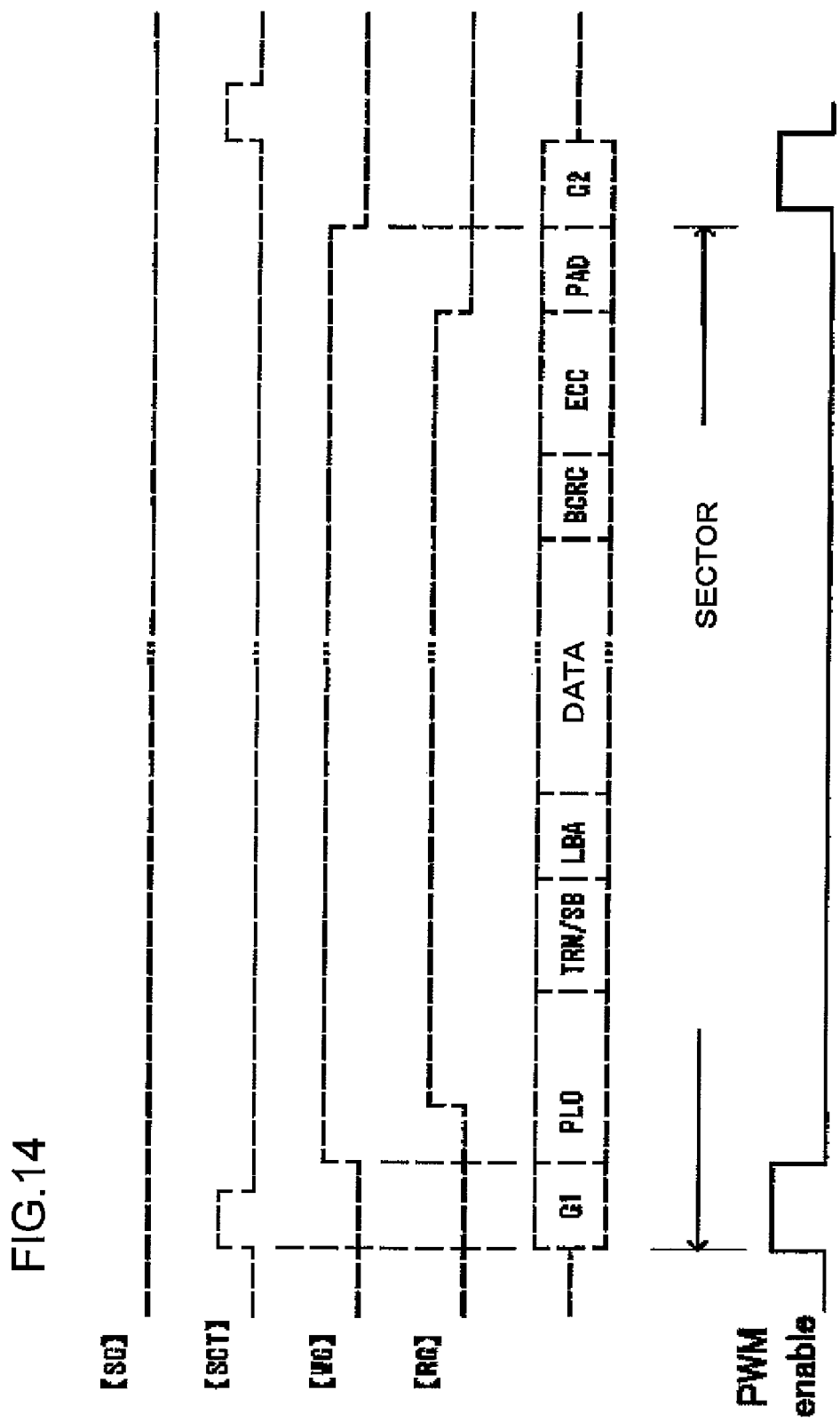

HEAD INTEGRATED CIRCUIT AND STORAGE APPARATUS INCLUDING THE SAME

BACKGROUND

1. Field of the Technique

The present technique relates to a head integrated circuit (IC) that drives a heating element for controlling spacing between a storage medium and a magnetic head, and also relates to a storage apparatus including the head IC.

2. Description of the Related Art

With recent sophistication of information processing technology, it has become important to ensure data reliability. Particularly, in a storage apparatus, the most important function is to reliably record data on a medium. In a magnetic disk apparatus, magnetic data is stored on a magnetic storage medium in response to a reversal of write current generated from data. The stored magnetic data is read by a read head (specifically, a magnetoresistive (MR) head based on a magnetoresistive effect), converted from the magnetic data into electric signal data, and sent to a controller.

When the magnetic disk apparatus proceeds to perform a write operation, first, a write gate signal from the controller causes a read channel to enter write mode and also causes a write current depending on data to flow through a write head.

Under low temperatures, the temperature of the write head is low before the write operation starts. Upon start of the write operation, the temperature of the write head is increased by application of the write current thereto. This causes a transient thermal stress to the magnetic pole of the write head. As a result, the write magnetic pole expands with heat and protrudes toward the storage medium. This is generally referred to as pole tip protrusion (PTP).

Although the magnetic pole does not protrude at the beginning of the write operation, the magnetic pole gradually protrudes as the duration of application of the write current increases. This means that the magnetic spacing between the storage medium and a magnetic head including the write head and the read head is relatively large at the beginning of the write operation, but decreases as the write operation proceeds.

Therefore, the write capability at the beginning of the write operation is lower than that at the end of the write operation. More specifically, the overwrite performance is degraded at the beginning of the write operation. That is, since the ability to overwrite previous data on a track is lower in earlier phases of the write operation, the previous data is observed as noise during the read operation, and thus the error rate is high.

As the write head gradually protrudes, the magnetic head becomes closer to the storage medium and the write operation is performed at a distance closer to the storage medium, so that the overwrite performance is generally improved. In particular, when the magnetic disk apparatus is used in low temperature environment, there is a considerable difference between the temperatures of the write head at the beginning and end of the write operation. That is, under low temperatures, the write performance at the beginning of the write operation is very low.

To improve the overwrite characteristics, there is a method in which, at a point when it is necessary to adjust magnetic spacing (for example, immediately before a write operation), heat power from a heater inside a magnetic head is applied and temporarily increased to reduce the response time of protrusion (see, for example, Japanese Laid-open Patent Publication No. 2004-342151 and US Patent Application Publication No. 2005/0057841A1).

As illustrated in FIG. 1, a known heater drive circuit for driving a heater of the above-described type is a linear control circuit (see, for example, Japanese Laid-open Patent Publication No. 2007-26565). As illustrated, the heater drive circuit passes a current from a current source, via a voltage adjusting resistor 116 and a transistor 118, to a heater (resistor) 100 provided in a head.

To supply a set amount of power to the heater 100, there are also provided a power calculator 112, a digital-to-analog converter (DAC) 110, and a differential amplifier 114. The power calculator 112 monitors the current and voltage levels of the heater 100 and converts them to a power level. The DAC 110 converts a set digital power level into an analog power level. The differential amplifier 114 calculates an error between the power level determined by the power calculator 112 and the set power level obtained by the conversion in the DAC 110. Then, the heater drive circuit controls the transistor 118 according to the error determined by the differential amplifier 114. That is, with feedback control, the amount of power to be supplied to the heater 100 is linearly controlled to the set power level.

SUMMARY

An object of the present technique is to provide a head integrated circuit that includes a heater drive circuit for driving, with high power efficiency, a heating element for controlling the spacing between a storage medium and a head. According to an aspect of an embodiment, a head integrated circuit for drives a head. The head includes a head unit and the heating element for adjusting spacing between the head and the storage medium. And the head integrated circuit includes at least a read amplifier for amplifying the read signal from the head unit and the heater drive circuit for driving the heating element. The heater drive circuit includes a measuring circuit configured to measure level of power supplied to the heating element, an error calculating circuit configured to calculate an error between predetermined power level and the measured power level, a pulse width modulation circuit configured to modulate the error into a pulse width, and a switch configured to operate in response to a pulse from the pulse width modulation circuit and supply power to the heating element.

BRIEF DESCRIPTION OF THE DRAWINGS

FIG. 14 illustrates an operation of the heater drive circuit of FIG. 13.

DESCRIPTION OF THE PREFERRED EMBODIMENTS

Hereinafter, embodiments of the present technique will be described in the following order: Configuration of Storage Apparatus, First Embodiment, Second Embodiment, Third Embodiment, Fourth Embodiment, Fifth Embodiment, and Other Embodiments. The present technique is not limited to these embodiments.

(Configuration of Storage Apparatus)

Figure 1:
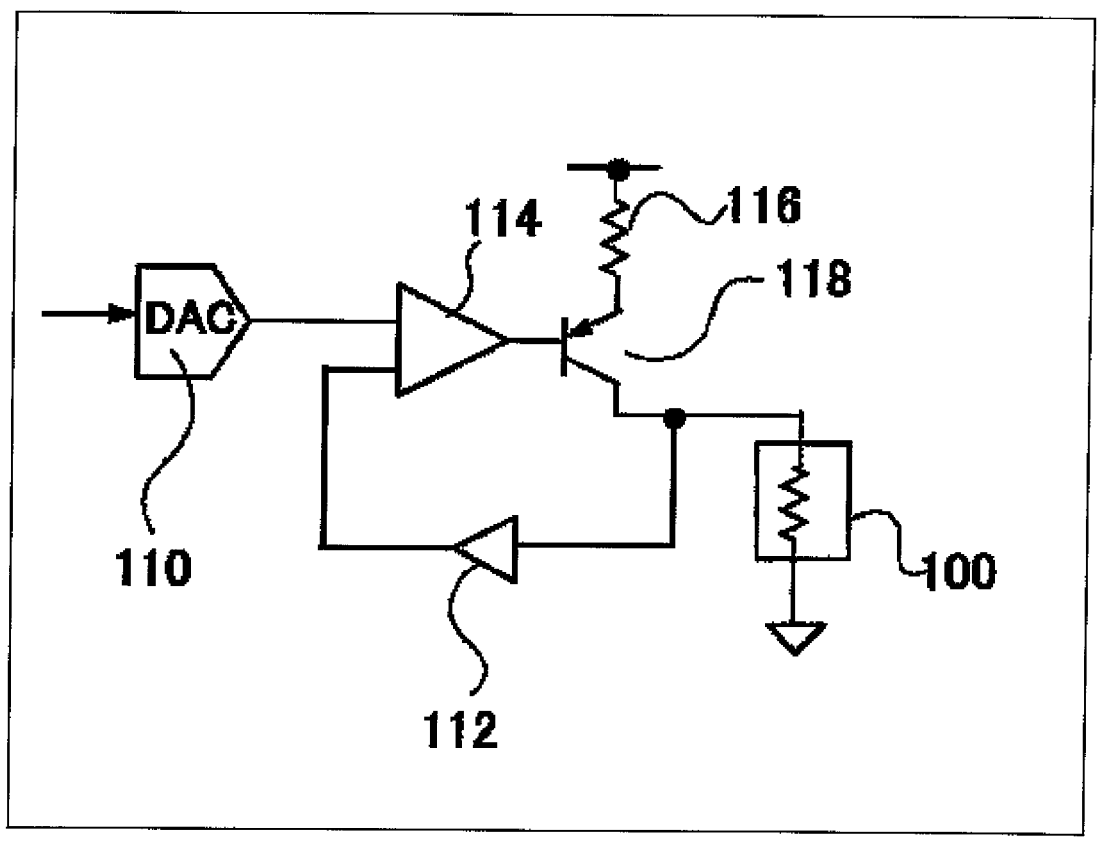
FIG. 1 illustrates a known heater drive circuit for controlling the amount of protrusion of a magnetic head.
Figure 2:
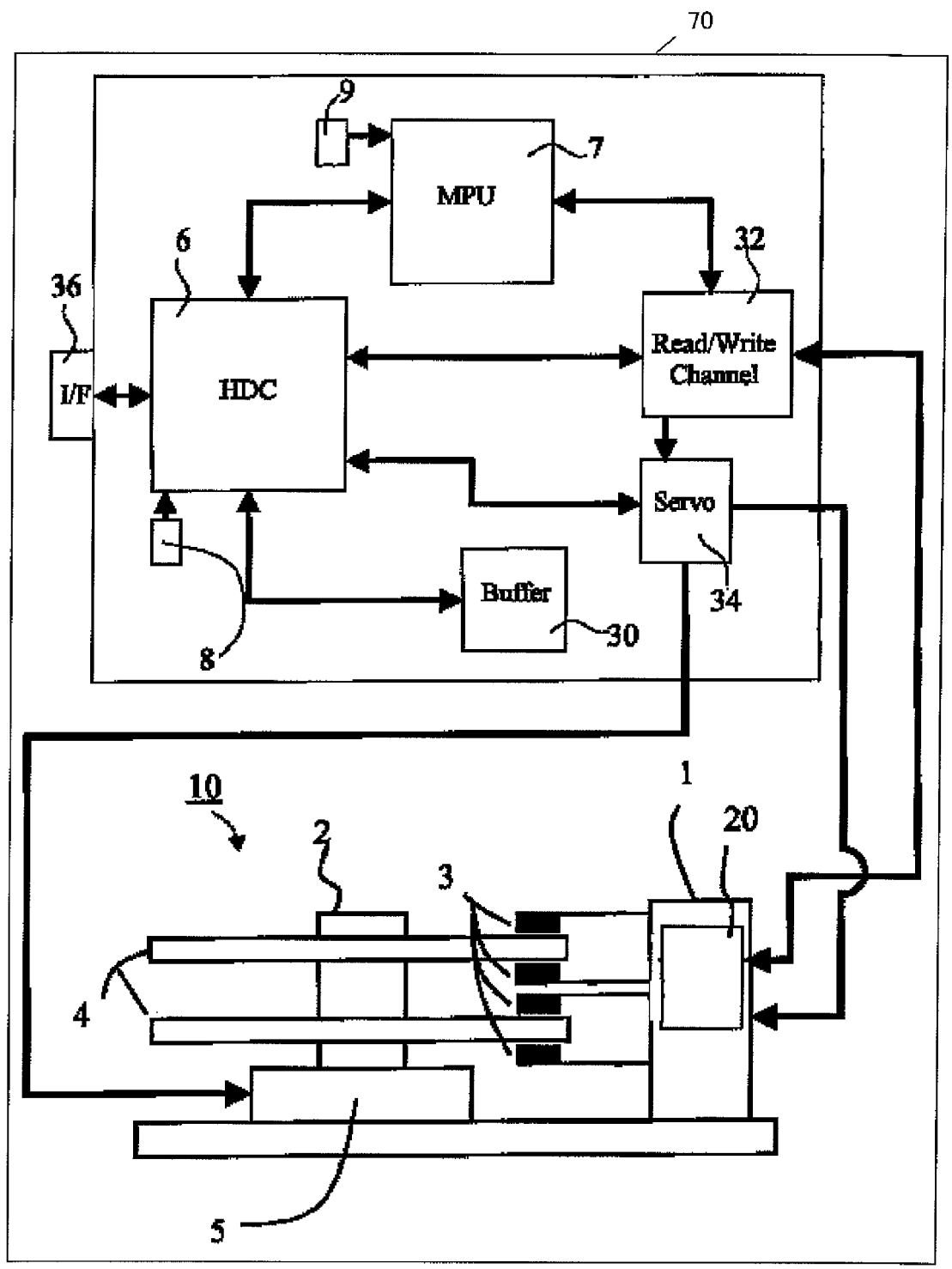
FIG. 2 illustrates a configuration of a storage apparatus according to an embodiment.
Figure 3:
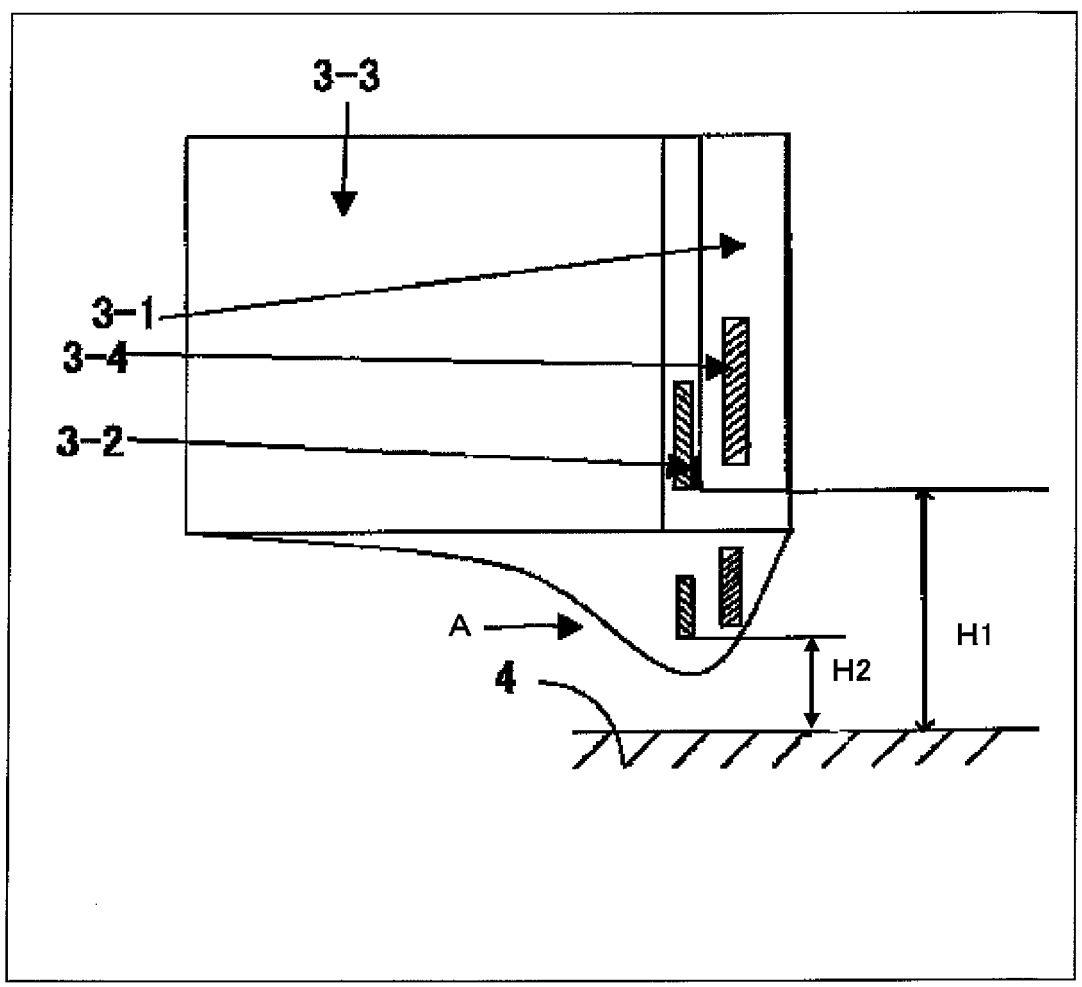
FIG. 3 illustrates a configuration of a magnetic head illustrated in FIG. 2.

FIG. 2 illustrates a configuration of a storage apparatus according to an embodiment. FIG. 3 illustrates a detailed configuration of a magnetic head of FIG. 2. FIG. 2 illustrates a magnetic disk apparatus 70 as an exemplary storage apparatus. As illustrated in FIG. 2, in a magnetic disk drive mechanism 10, magnetic disks 4 serving as magnetic storage media are held by a rotation shaft 2 of a spindle motor 5. The spindle motor 5 rotates the magnetic disks 4. An actuator 1 is provided with magnetic heads 3, each being attached to a tip of a suspension and an arm. The actuator 1 moves the magnetic heads 3 in the radial direction of the magnetic disks 4.

The actuator 1 includes a voice coil motor (VCM) for pivoting the arms about the rotational axis. In the example of FIG. 2, the magnetic disk apparatus has two magnetic disks 4, and four magnetic heads 3 are simultaneously driven by the same actuator 1.

Each magnetic head 3 includes a read element and a write element as a head unit. The read element reads a read signal from the magnetic disks 4. The write element writes a write signal to the magnetic disks 4. The magnetic head 3 has a laminated structure in which the read element including an MR element is formed and the write element including a write coil is formed on the read element on a slider.

In the magnetic disk drive mechanism 10, a preamplifier IC (head IC) 20 (illustrated in detail in FIG. 4) is disposed on a side of the actuator 1. Alternatively, the preamplifier IC 20 may be disposed on each suspension, instead of on the actuator 1.

A control printed circuit board (control circuit unit) includes a hard disk controller (HDC) 6, a microprocessor unit (MPU) 7, clock sources 8 and 9, a buffer circuit 30, a read/write channel circuit 32, and a servo circuit 34.

The read/write channel circuit 32 is connected to the preamplifier IC 20 and controls the read/write operation of the magnetic head 3. The read/write channel circuit 32 includes a write circuit that supplies a write signal to the magnetic head 3, and a read circuit that receives a read signal from the magnetic head 3 and demodulates the received read signal. The servo circuit 34 includes a spindle motor drive circuit that drives the spindle motor 5, and a motor drive circuit that drives the voice coil motor according to an error between a target position and an actual position detected on the basis of a servo signal for a read signal from the read/write channel circuit 32.

The HDC 6 communicates with a host via an interface (I/F) 36, such as a universal serial bus (USB) interface, an advanced technology attachment (ATA) interface, or a small computer system interface (SCSI). The HDC 6 determines the position on a track of a magnetic disk 4 with reference to a sector number in the servo signal, and records and reproduces data on and from the magnetic disk 4. The buffer circuit 30 temporarily stores read data and write data.

The MPU 7 analyzes commands from the HDC 6 to perform various types of processing through the HDC 6. For this purposes, the MPU 7 has a read-only memory (ROM) and a random-access memory (RAM).

Each magnetic disk 4 has tracks concentrically arranged thereon. On each track, servo signals (position signals) are recorded circumferentially at regular intervals. Each track contains a plurality of sectors. A position signal includes a servo mark (Servo Mark), a track number (Gray Code), an index (Index), and offset information or servo bursts (PosA, PosB, PosC, and PosD).

One or a plurality of magnetic disks 4 are stacked and held by the rotation shaft 2 of the spindle motor 5.

As illustrated in FIG. 3, the magnetic head 3 includes a slider 3-3, a read element 3-2 (MR element, such as a tunnel magnetoresistance (TMR) element) on the slider 3-3, a write element (electromagnetic inductor) 3-1 on the read element 3-2, and a heater 3-4 as a heating element. The slider 3-3 is held by a suspension (not shown).

The suspension is mechanically secured to a carriage arm, which is held by the actuator 1. A coil included in the voice coil motor is attached to an end of the carriage arm distant from the magnetic head 3. Magnets are disposed on opposite sides of the coil. With respect to the magnetic disk 4 rotated by the spindle motor 5, the magnetic head 3 on the suspension supported by the carriage arm moves along any track (also referred to as a cylinder) specified by a controller, and reads and writes data in a specified data format.

An airflow generated by rotation of the magnetic disk 4 allows the slider 3-3 to slide. An air bearing is formed between the opposite surfaces of the magnetic disk 4 and slider 3-3. A negative pressure generated by the air bearing and a spring force of a gimbal in the suspension allow the floating position of the slider 3-3 to be maintained.

The heater (resistor) 3-4 is disposed near the write element 3-1 and read element 3-2 in the magnetic head 3. In the example of FIG. 3, the heater 3-4 is disposed near the write coil of the write element 3-1 with an insulating layer interposed between the write coil and the heater 3-4. A protrusion A occurs by heat from the heater 3-4.

The distance H1 between the lower end of the read element 3-2 and the surface of the magnetic disk 4 corresponds to original magnetic spacing, while the distance H2 between the lower end of the protrusion A of the read element 3-2 and the surface of the magnetic disk 4 corresponds to magnetic spacing resulting from the protrusion.

Figure 4:
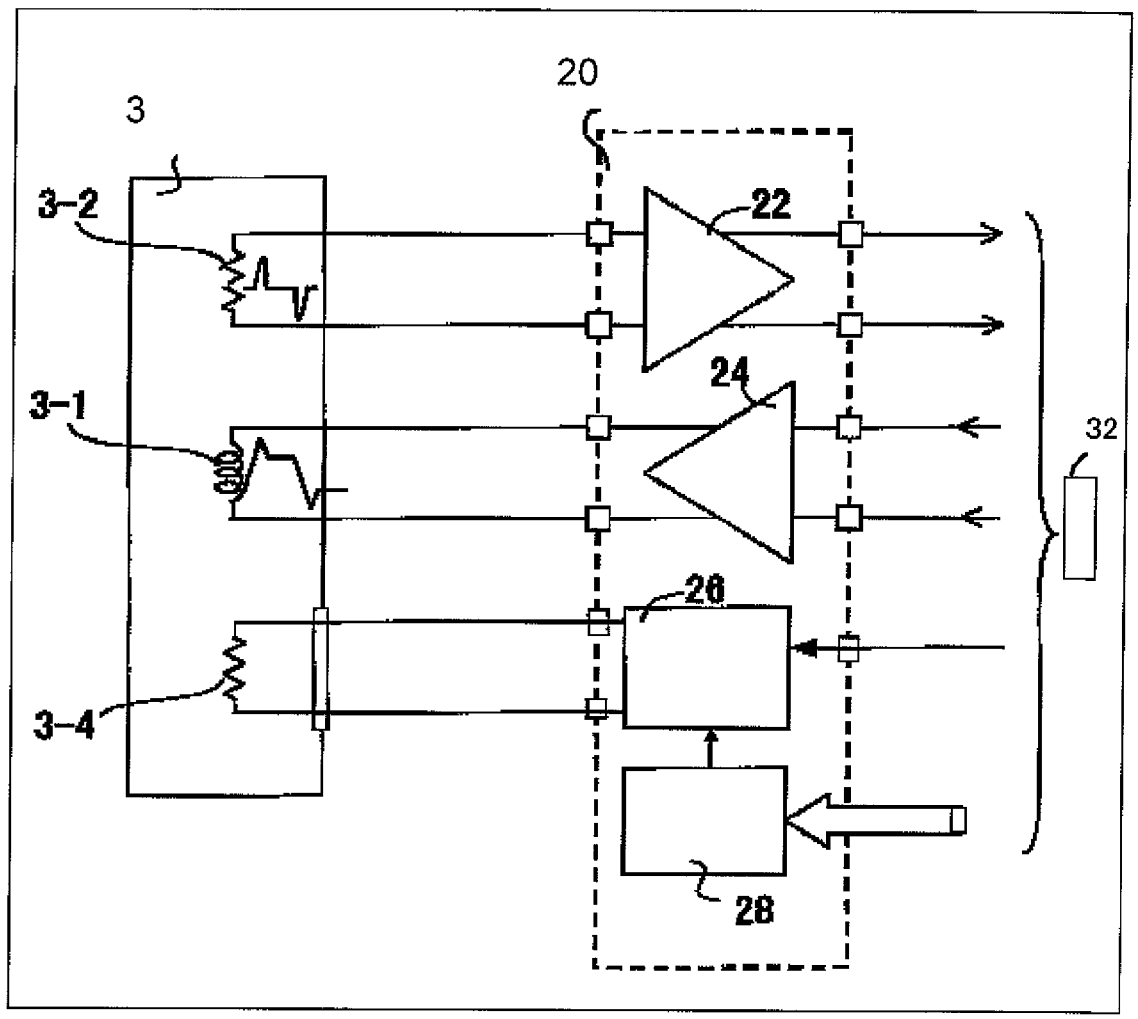
FIG. 4 illustrates a configuration of a preamplifier IC illustrated in FIG. 2.

FIG. 4 is a block diagram illustrating the preamplifier IC 20 of FIG. 2. As illustrated in FIG. 4, the preamplifier IC 20 includes a read amplifier 22 that amplifies a read signal from the read element 3-2 and outputs the amplified read signal to the read/write channel circuit 32, a write driver 24 that amplifies a write signal from the read/write channel circuit 32 and supplies the amplified write signal to the write element 3-1, a heater drive circuit 26 that receives a set power level from the read/write channel circuit 32 to drive the heater 3-4 in the magnetic head 3, and a logic circuit 28 that performs the setting of the read amplifier 22, the write driver 24, and the heater drive circuit 26.

Additionally, the logic circuit 28 includes a circuit that detects contact with the magnetic disk 4 on the basis of an output from the read element 3-2, and a head switching circuit that selects one of a plurality of heads.

First Embodiment

Figure 5:
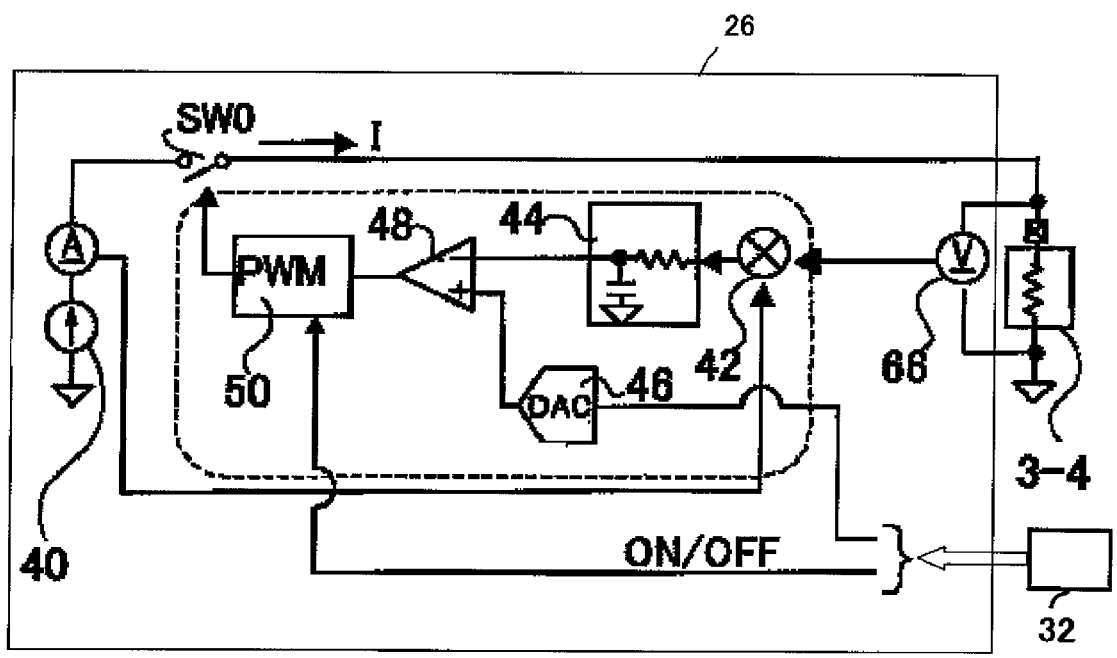
FIG. 5 illustrates a configuration of a heater drive circuit according to a first embodiment.
Figure 6:
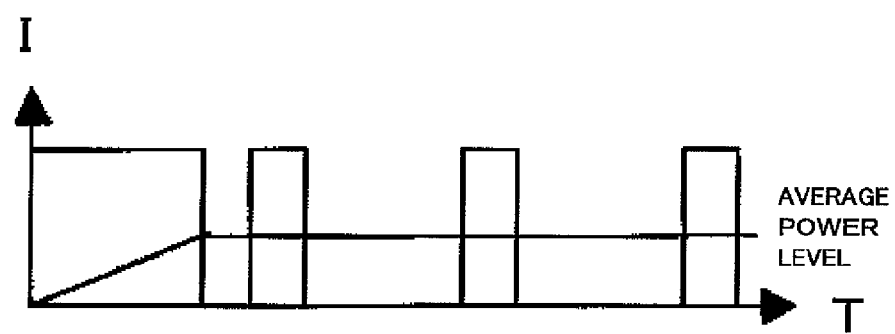
FIG. 6 illustrates a current waveform of the heater drive circuit of FIG. 5.

FIG. 5 illustrates a configuration of a heater drive circuit according to a first embodiment. FIG. 6 illustrates a current waveform of the heater drive circuit of FIG. 5.

As illustrated in FIG. 5, the heater drive circuit 26 includes a voltage detecting circuit 66 that detects a voltage across the heater 3-4, a multiplier circuit 42 that multiplies the current of the current source 40 by the detected voltage to output a power level, and an integrator 44 that averages the power levels from the multiplier circuit 42 to output an average power level.

The heater drive circuit 26 further includes a digital-to-analog converter (DAC) 46 that converts a set power level received from the read/write channel circuit 32 into an analog value, an error amplifier 48 that outputs an error between the set power level and the detected power level, a pulse width modulation (PWM) circuit 50 that generates at predetermined intervals a switching signal having a pulse width corresponding to the error value output from the error amplifier 48, and a switch SW0 that is responsive to an on/off switching signal and supplies a current I from the current source 40 to the heater 3-4.

The switch SW0 is a transistor. The voltage detecting circuit 66, the multiplier circuit 42, the integrator 44, the DAC 46, and the error amplifier 48 form a feedback loop.

The read/write channel circuit 32 changes the set power level according to the environmental conditions (such as the temperature and the like), read characteristics, and write characteristics of the apparatus. When a single heater drive circuit is used by a plurality of magnetic heads, the read/write channel circuit 32 selects a set power level corresponding to the characteristics of a specified magnetic head.

As illustrated in FIG. 6, the maximum level of drive current for driving the heater 3-4 is the current level of the current source 40. The PWM circuit 50 adjusts the on-duty ratio of the PWM wave according to the output power. By the operation of the switch SW0 responsive to an on/off switching signal supplied thereto, a drive current having a width corresponding to a power error value is supplied to the heater 3-4.

Under on/off control, if, for example, the amount of heating of the heater 3-4 is to be reduced by half, it is only necessary to set the pulse width to half a predetermined pulse period. Therefore, power consumption efficiency can be improved. That is, the heating of the heater 3-4 can be controlled with low power consumption.

For example, in a known linear circuit, when the minimum power level is set to 3 mW, the current Imin is 13 mA and voltage Vin is 3.3 V, while Iout is 5.6 mA and Vout is 0.53 V. That is, a power of 43 mW is required and the conversion efficiency of the linear circuit is less than 10%. On the other hand, a PWM drive circuit requires a power of only 3.8 mW to produce the same output (3 mW) as that of the known linear circuit. Therefore, the conversion efficiency of the PWM drive circuit can be improved to the 70% to 80% range.

The PWM circuit 50 is basically a logic circuit configured to produce a binary output, while the switch SW0 is also a binary drive transistor. This means that logic circuits constitute half the heater drive circuit 26. Therefore, a small transistor size and a small circuit size can be achieved.

In particular, since the preamplifier IC 20 is independent of the other circuits and is included in the magnetic disk drive mechanism 10, the size of the preamplifier IC 20 is limited. Therefore, if the circuit size of the heater drive circuit 26 is small, it is easier to add other functional circuits to the preamplifier IC 20 and is more advantageous for enhancing the multi-functionality of the preamplifier IC 20.

Second Embodiment

Figure 7:
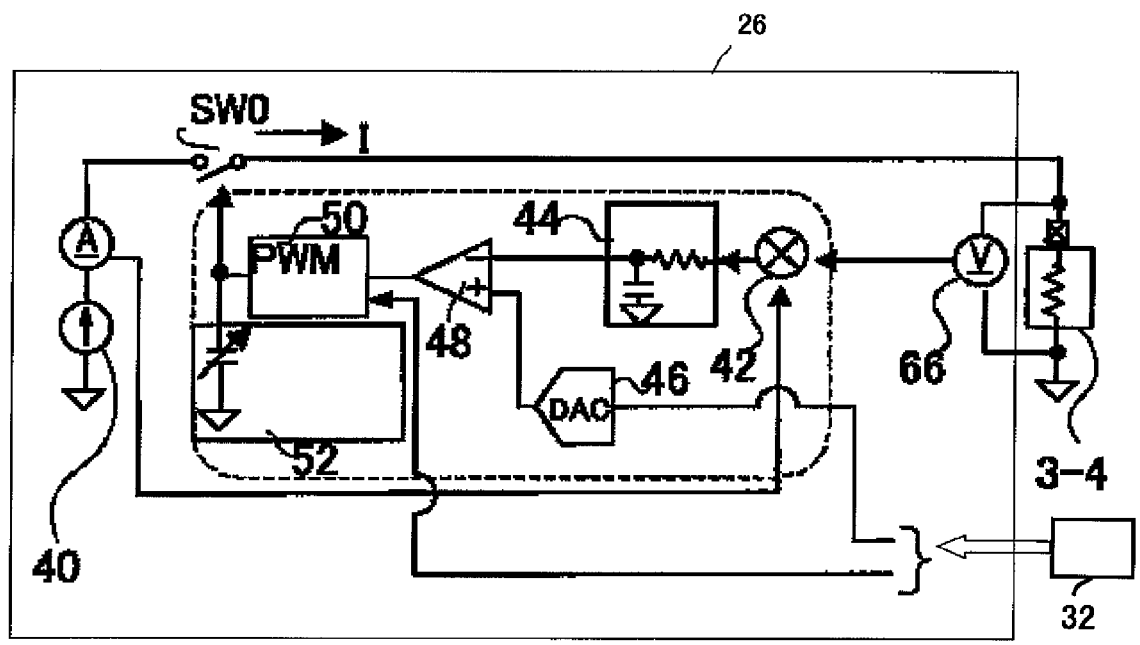
FIG. 7 illustrates a configuration of a heater drive circuit according to a second embodiment.
Figure 8:
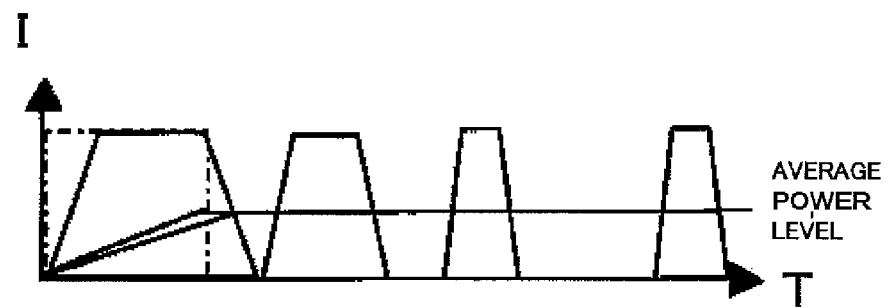
FIG. 8 illustrates a current waveform of the heater drive circuit of FIG. 7.

FIG. 7 illustrates a configuration of a heater drive circuit according to a second embodiment. FIG. 8 illustrates a current waveform of the heater drive circuit of FIG. 7.

In FIG. 7, components identical to those illustrated in FIG. 5 are given the same reference numerals. As in the case of FIG. 5, the heater drive circuit 26 of FIG. 7 includes the voltage detecting circuit 66, the multiplier circuit 42, the integrator 44, the digital-to-analog converter (DAC) 46, the error amplifier 48, the pulse width modulation circuit (PWM) 50, and the switch SW0.

Additionally, the heater drive circuit 26 includes a current waveform blunting circuit 52 on the output side of the PWM circuit 50. The current waveform blunting circuit 52 blunts a square PWM waveform of the PWM circuit 50 and is, for example, a capacitor. The switch SW0 is a transistor. The voltage detecting circuit 66, the multiplier circuit 42, the integrator 44, the DAC 46, and the error amplifier 48 form a feedback loop.

As illustrated in FIG. 8, the maximum level of drive current for driving the heater 3-4 is the current level of the current source 40. The PWM circuit 50 adjusts the on-duty ratio of the PWM wave according to the output power. The current waveform blunting circuit 52 blunts a pulsed PWM waveform of the PWM circuit 50. Therefore, a switching signal supplied to the switch SW0 has a substantially trapezoidal waveform. By the operation of the switch SW0 responsive to the switching signal supplied thereto, a drive current having a trapezoidal waveform with a pulse width corresponding to a power error value is supplied to the heater 3-4.

A PWM method is known to cause switching noise. When the heater drive circuit 26 of PWM type is included in the preamplifier IC 20, noise is superimposed on a read signal and a write signal and may degrade the read/write performance. To reduce noise associated with abrupt changes in voltage and current that are caused by PWM switching, it is necessary to increase a temporal differential value (di/dt) of current so as not to reduce switching time. Accordingly, the output waveform of the PWM circuit 50 is blunted.

This is achieved simply by providing a capacitor (current waveform blunting circuit 52) as described above. Thus, noise can be reduced without increasing the circuit size.

In the second embodiment, it is possible with the PWM method to control the heating of the heater with low power consumption. Again, since logic circuits constitute substantial part of the heater drive circuit 26, a small transistor size and a small circuit size can be achieved. When the circuit size of the heater drive circuit 26 is small, it is easier to add other functional circuits to the preamplifier IC 20 and is advantageous for enhancing the multi-functionality of the preamplifier IC 20.

Third Embodiment

Figure 9:
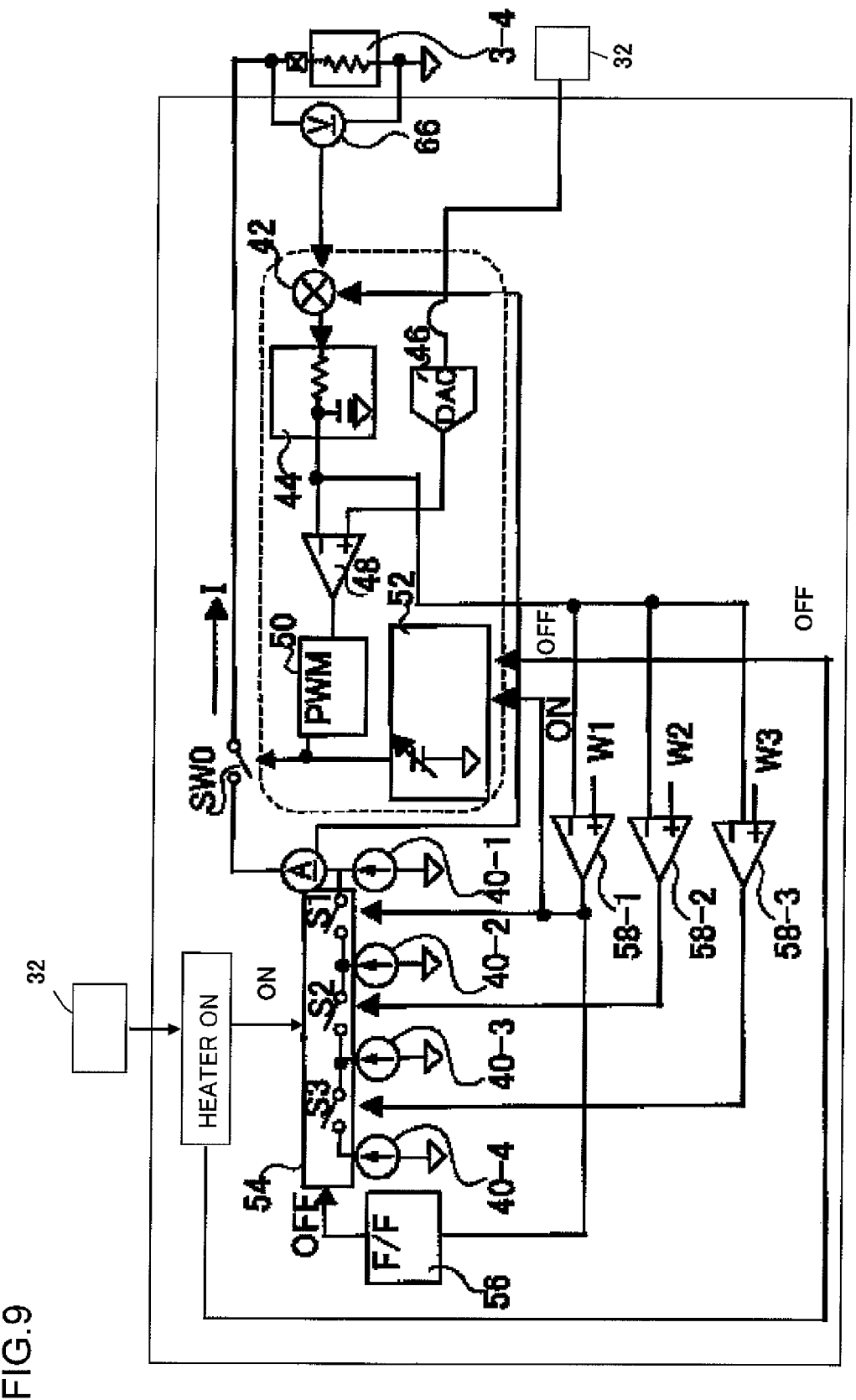
FIG. 9 illustrates a configuration of a heater drive circuit according to a third embodiment.
Figure 10:
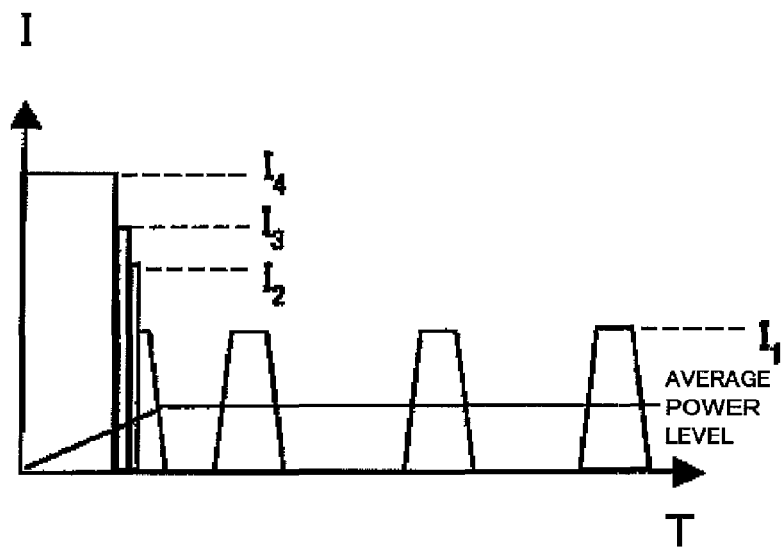
FIG. 10 illustrates a current waveform of the heater drive circuit of FIG. 9.

FIG. 9 illustrates a configuration of a heater drive circuit according to a third embodiment. FIG. 10 illustrates a current waveform of the heater drive circuit of FIG. 9.

In FIG. 9, components identical to those illustrated in FIG. 5 and FIG. 7 are given the same reference numerals. As in the cases of FIG. 5 and FIG. 7, the heater drive circuit 26 of FIG. 9 includes the voltage detecting circuit 66, the multiplier circuit 42, the integrator 44, the digital-to-analog converter (DAC) 46, the error amplifier 48, the pulse width modulation circuit (PWM) 50, and the switch SW0.

Also as in the case of FIG. 7, the current waveform blunting circuit 52 is provided on the output side of the PWM circuit 50. The current waveform blunting circuit 52 blunts a square PWM waveform of the PWM circuit 50 and is, for example, a capacitor. The switch SW0 is a transistor. The voltage detecting circuit 66, the multiplier circuit 42, the integrator 44, the DAC 46, and the error amplifier 48 form a feedback loop.

In the second embodiment illustrated in FIG. 7, when a current waveform is simply blunted to reduce noise, the heating of the heater 3-4 is delayed when the heater 3-4 is turned on. As a result, it takes a long time before the amount of head protrusion becomes stable. As a solution to this, as illustrated in FIG. 9, the current waveform blunting circuit 52 is turned off only when the heater 3-4 is turned on. For example, a switch for the current waveform blunting circuit 52 is placed between the output terminal of the pulse width modulation circuit 50 and the capacitor serving as the current waveform blunting circuit 52. Then, at the rising edge of a heater-on signal from the read/write channel circuit 32, the switch is turned off and held for a predetermined period of time.

Additionally, to reduce the time for head protrusion, a current is increased only when the heater 3-4 is turned on. However, since this tends to cause noise, the current is reduced stepwise as an average power level approaches the set power level. Thus, noise caused by abrupt changes in current can be reduced.

As illustrated in FIG. 9, in addition to a first current source 40-1, there are provided a plurality of (for example, three) current sources: a second current source 40-2, a third current source 40-3, and a fourth current source 40-4. The three current sources 40-2, 40-3, and 40-4 are connected to the output side of the current source 40-1 via switches S1, S2, and S3, respectively.

Additionally, a first comparator 58-1, a second comparator 58-2, and a third comparator 58-3 are provided. The three comparators 58-1, 58-2, and 58-3 compare an average power level output from the integrator 44 with threshold values W1, W2, and W3 (W1>W2>W3), respectively. Then, according to the results of the comparison, the comparators 58-1, 58-2, and 58-3 on/off control the switches S1, S2, and S3, respectively.

Referring to FIG. 10, the operation based on the configuration of FIG. 9 will be described. In response to a heater-on signal from the read/write channel circuit 32, the switches S1, S2, and 53 are turned on and the current waveform blunting circuit 52 is turned off. Therefore, a current I4 equivalent to the sum of output currents from the four current sources 40-1, 40-2, 40-3, and 40-4 is supplied to the switch SW0. Thus, as illustrated in FIG. 10, when the heater 3-4 is turned on, the current I4 is supplied from the switch SW0 to the heater 3-4.

Thus, a detected average power level output from the integrator 44 increases. The third comparator 58-3 compares the average power level with the threshold value W3. When the average power level reaches the threshold value W3, the third comparator 58-3 turns off the switch S3. As a result, the current from the fourth current source 40-4 is shut off, and a current I3 equivalent to the sum of output currents from the three current sources 40-1, 40-2, and 40-3 is supplied to the switch SW0. Thus, as illustrated in FIG. 10, the current I4 is reduced to the current I3 and supplied from the switch SW0 to the heater 3-4.

The detected average power level output from the integrator 44 further increases. The second comparator 58-2 compares the average power level with the threshold value W2. When the average power level reaches the threshold value W2, the second comparator 58-2 turns off the switch S2. As a result, the current from the third current source 40-3 is shut off, and a current I2 equivalent to the sum of output currents from the two current sources 40-1 and 40-2 is supplied to the switch SW0. Thus, as illustrated in FIG. 10, the current I3 is reduced to the current I2 and supplied from the switch SW0 to the heater 3-4.

The detected average power level output from the integrator 44 further increases. The first comparator 58-1 compares the average power level with the threshold value W1. When the average power level reaches the threshold value W1, the first comparator 58-1 turns off the switch S1. As a result, the current from the second current source 40-2 is shut off, and a current I1 from the first current source 40-1 is supplied to the switch SW0. Thus, as illustrated in FIG. 10, the current I2 is reduced to the current I1 and supplied from the switch SW0 to the heater 3-4.

At the same time, in response to an instruction output from the first comparator 58-1, the switch for the current waveform blunting circuit 52 is turned on, and the PWM waveform of the PWM circuit 50 is blunted. Also, the output from the first comparator 58-1 is held by a flip-flop circuit 56, and the switches S1, S2, and S3 are held in an off-state.

As described above, the current is increased only when the heater 3-4 is turned on. Then, since the current is reduced stepwise as the average power level approaches the set power level, noise caused by abrupt changes in current is reduced.

Thus, the time for head protrusion occurring when the heater 3-4 is turned on is reduced, while noise is reduced by reducing the current stepwise. Additionally, when the average power level is reached, the output waveform from the PWM circuit 50 is blunted, so that noise is reduced.

In the third embodiment, it is also possible with the PWM method to control the heating of the heater with low power consumption. Again, since logic circuits constitute substantial part of the heater drive circuit 26, a small transistor size and a small circuit size can be achieved. When the circuit size of the heater drive circuit 26 is small, it is easier to add other functional circuits to the preamplifier IC 20 and is advantageous for enhancing the multi-functionality of the preamplifier IC 20.

In the heater drive circuit 26 of FIG. 9, if the first comparator 58-1 only is provided and on/off controls the current waveform blunting circuit 52, the maximum amount of current supplied to the heater 3-4 is the same as that in the case of FIG. 9. However, since the current waveform is not blunted when rising, the time for head protrusion can be effectively reduced.

Fourth Embodiment

Figure 11:
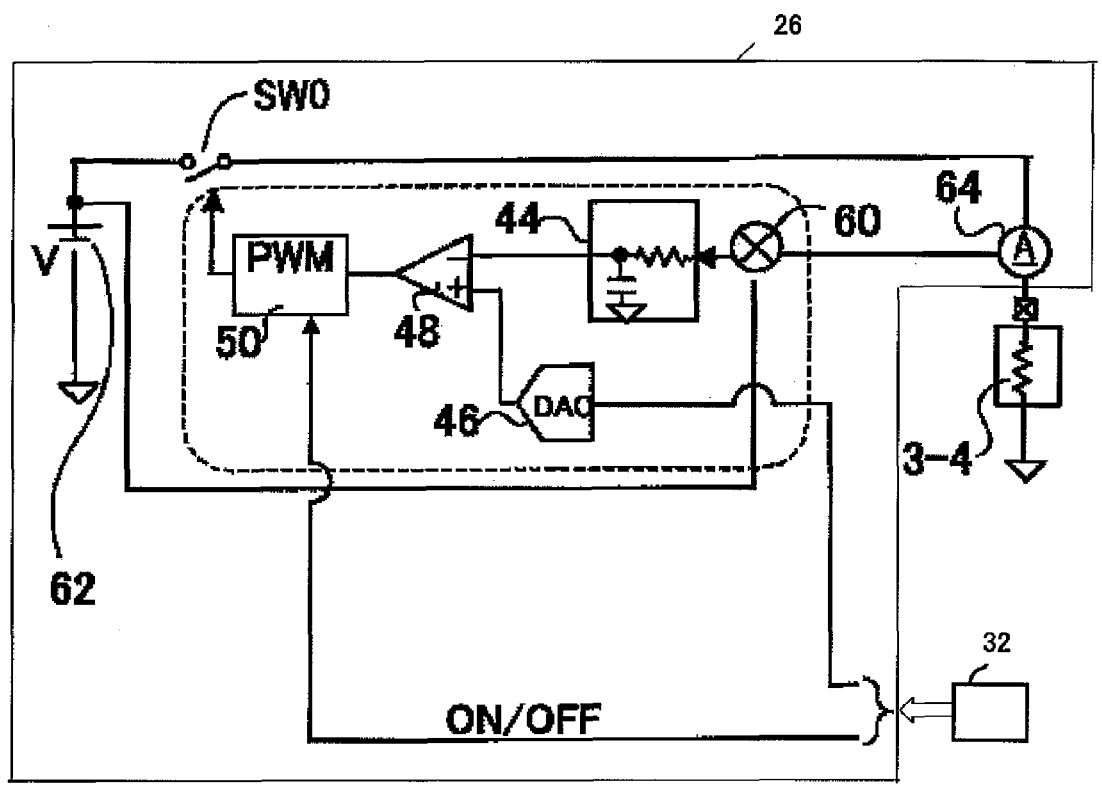
FIG. 11 illustrates a configuration of a heater drive circuit according to a fourth embodiment.
Figure 12:
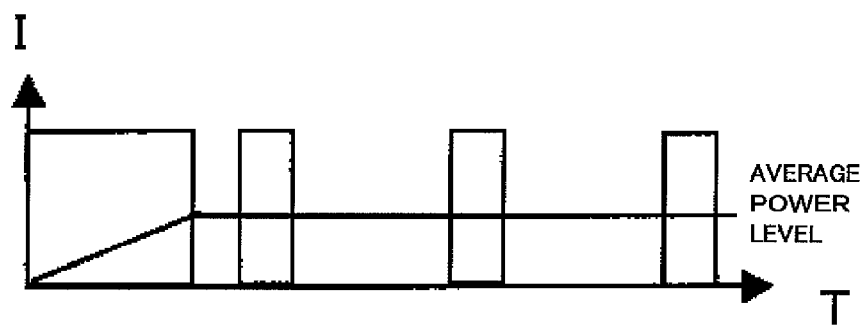
FIG. 12 illustrates a voltage waveform of the heater drive circuit of FIG. 11.

FIG. 11 illustrates a configuration of a heater drive circuit according to a fourth embodiment. FIG. 12 illustrates a voltage waveform of the heater drive circuit of FIG. 11.

In FIG. 11, components identical to those illustrated in FIG. 5 are given the same reference numerals. Instead of the current source 40 of FIG. 5, the heater drive circuit 26 of FIG. 11 includes a voltage source 62. In the heater drive circuit 26 of FIG. 5, it is necessary to produce the current source 40. The current source 40 consumes power while generating a current. On the other hand, the voltage source 62 of FIG. 11 can be obtained simply by dividing a reference voltage of the apparatus. Since control is carried out with voltage alone, a further reduction of power consumption is achieved.

The heater drive circuit 26 includes the voltage source 62, a current detecting circuit 64 that detects a current supplied to the heater 3-4, and a multiplier circuit 60 that multiplies the voltage of the voltage source 62 by the detected current to determine the power level. As in the case of FIG. 5, the heater drive circuit 26 of FIG. 11 further includes the integrator 44, the digital-to-analog converter (DAC) 46, the error amplifier 48, the pulse width modulation circuit (PWM) 50, and the switch SW0.

The switch SW0 is a transistor. The voltage detecting circuit 66, the multiplier circuit 60, the integrator 44, the DAC 46, and the error amplifier 48 form a feedback loop.

As illustrated in FIG. 12, the maximum level of drive voltage for driving the heater 3-4 is the voltage level of the voltage source 62. The PWM circuit 50 adjusts the on-duty ratio of the PWM wave according to the output power. By the operation of the switch SW0 responsive to an on/off switching signal supplied thereto, a drive voltage having a width corresponding to a power error value is supplied to the heater 3-4.

As in the case of the first embodiment illustrated in FIG. 5, power consumption efficiency can be improved and it is possible to control the heating of the heater with low power consumption. Moreover, with the use of the voltage source 62, a further reduction of power consumption is achieved. As in the case of FIG. 5, logic circuits constitute half the heater drive circuit 26. Therefore, both a small transistor size and a small circuit size can be achieved.

In the fourth embodiment of FIG. 11, a voltage waveform blunting circuit equivalent to the current waveform blunting circuit 52 of FIG. 7 may further be provided on the output side of the PWM circuit 50. As in the case of the second embodiment illustrated in FIG. 7, the voltage waveform blunting circuit blunts a square PWM waveform of the PWM circuit 50 into a substantially trapezoidal form. By the operation of the switch SW0 responsive to a switching signal supplied thereto, a drive voltage having a trapezoidal waveform with a pulse width corresponding to a power error value is supplied to the heater 3-4. Thus, PWM noise can be reduced.

As in the case of the third embodiment illustrated in FIG. 9, a mechanism for reducing the time for head protrusion may further be provided.

Fifth Embodiment

Figure 13:
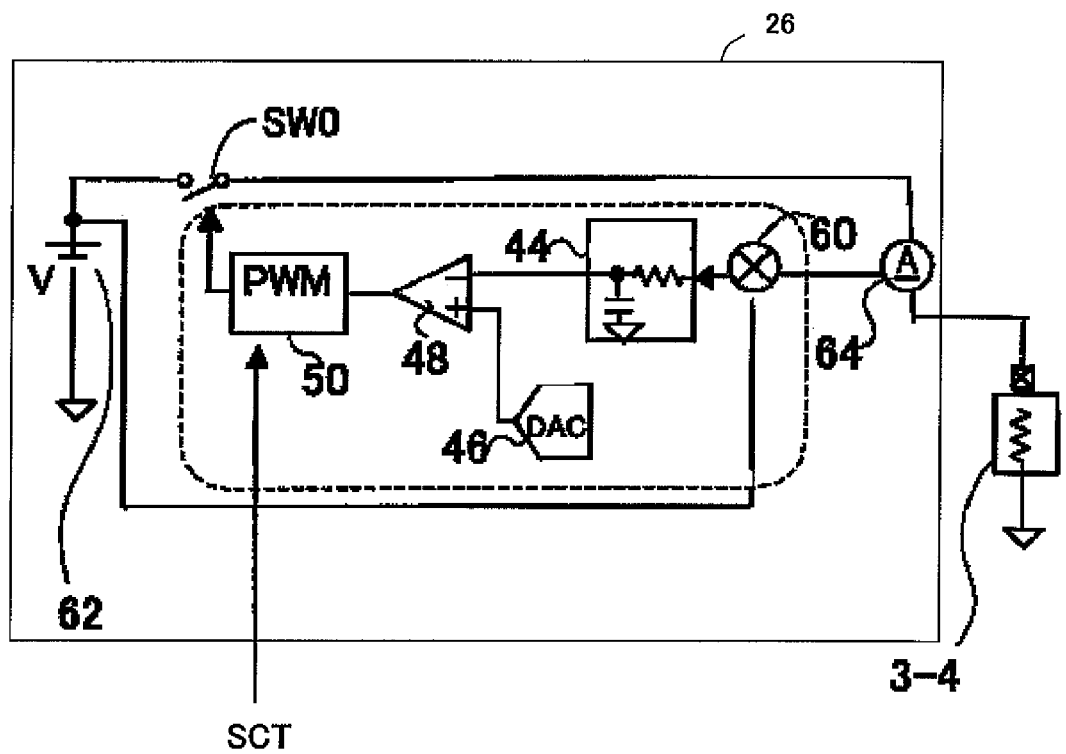
FIG. 13 illustrates a configuration of a heater drive circuit according to a fifth embodiment.

FIG. 13 illustrates a configuration of a heater drive circuit according to a fifth embodiment. FIG. 14 illustrates an operation of the heater drive circuit of FIG. 13.

In FIG. 13, components identical to those illustrated in FIG. 11 are given the same reference numerals. As in the case of FIG. 11, the heater drive circuit 26 of FIG. 13 includes the voltage source 62, the current detecting circuit 64, the multiplier circuit 60, the integrator 44, the digital-to-analog converter (DAC) 46, the error amplifier 48, the pulse width modulation circuit (PWM) 50, and the switch SW0.

The PWM circuit 50 is controlled such that it is enabled only during a sector signal detection pulse (SCT) period.

As illustrated in FIG. 14, a sector of each magnetic disk 4 of FIG. 2 contains a gap G1, preambles (payload PLD, sync byte TRN/SB), a logical block address LBA, a data area, check codes (block CRC, ECC), a pad PAD, and a gap G2. A read/write operation for the preambles, logical block address LBA, data area, check codes, and pad PAD is performed in response to a read gate RG or a write gate WG.

On the other hand, the gaps G1 and G2 are provided between adjacent sectors in consideration of rotational fluctuations of the magnetic disk 4, and are typically not subjected to the read/write operation. The sector signal detection pulse, which corresponds to the gap G1, is issued to indicate the start of a sector.

Therefore, when the PWM circuit 50 is enabled in synchronization with the sector signal detection pulse, PWM noise does not affect the read/write operation. In this case, the PWM pulse period is made to coincide with the period in which the PWM circuit 50 is enabled in synchronization with the sector signal detection pulse. For example, when a magnetic disk having an outer track including 512 sectors rotates at 5400 rpm, since the time required for head protrusion is in the 90 µs to 100 µs range, the protrusion is completed in a time period corresponding to the rotation of 5 sectors.

Thus, by PWM-driving the heater 3-4 at time points when the read/write operation on the servo areas and data areas of actual tracks is not performed, it is possible to prevent PWM noise from affecting the read/write operation.

Other Embodiments

As a safety mechanism for preventing runaway of a heater, it is preferable to define a maximum duty cycle such that turn-off pulses are generated at regular intervals. Thus, even if feedback fails for some reason, it is possible to prevent the PWM pulse from being in an on-state and to prevent a heating value from exceeding a limit for the head.

Although the magnetic disk apparatus of the above embodiments has been described as one having two magnetic disks, the present technique is also applicable to a magnetic disk apparatus having one, three, or more magnetic disks. At the same time, the shape of the magnetic head is not limited to that illustrated in FIG. 3. The present technique is also applicable to a separate-type magnetic head. Additionally, the present technique is applicable not only to the heater drive circuit of the magnetic disk apparatus described above, but also applicable to a heater drive circuit for controlling spacing between a medium and a magnetic head of a magneto-optical storage apparatus, and to a heater drive circuit for controlling spacing between a medium and an optical head of an optical storage apparatus. The present technique is also applicable to a heater drive circuit included in the control circuit, instead of in the head IC.

With the heater drive circuit including the pulse width modulation circuit and the switch, a power level can be controlled by adjusting the ratio of a pulse width to a predetermined pulse period. Thus, the heating of the heater can be controlled with low power consumption. At the same time, since logic circuits constitute substantial part of the heater drive circuit, a small transistor size and a small circuit size can be achieved. This makes it easier to add other functional circuits to the head integrated circuit and is advantageous for enhancing the multi-functionality of the head integrated circuit.

What is claimed is:

1. A storage apparatus comprising:
a head including
a head unit for reading a signal from a storage medium, and
a heating element for adjusting spacing between the head and the storage medium;
an actuator configured to move the head to a predetermined target position on the storage medium; and
a head integrated circuit including
a read amplifier configured to amplify a read signal from the head unit; and
a heater drive circuit configured to drive the heating element, the heater drive circuit including:
a measuring circuit configured to measure level of power supplied to the heating element, an error calculating circuit configured to calculate an error between a predetermined power level and the measured power level, a pulse width modulation circuit configured to modulate the error into a pulse width, and a switch configured to operate in response to a pulse from the pulse width modulation circuit and supply power to the heating element.

2. The storage apparatus according to claim 1, further comprising a waveform blunting circuit connected to an output of the pulse width modulation circuit and configured to blunt the pulse waveform.

3. The storage apparatus according to claim 2, wherein the waveform blunting circuit stops blunting the pulse waveform for a predetermined period when the heater drive circuit turns on the heating element.

4. The storage apparatus according to claim 1, further comprising:
a power source connected to the switch; and
a power level control circuit configured to change a power level of the power source stepwise according to the measured power level.

5. The storage apparatus according to claim 4, wherein the power source is a current source.

6. The storage apparatus according to claim 4, wherein the power source is a voltage source.

7. The storage apparatus according to claim 4, wherein the power source includes a plurality of power source elements; and
the power level control circuit is a selecting circuit configured to select an appropriate power source element from the plurality of power source elements according to the measured power level.

8. The storage apparatus according to claim 1, wherein the heater drive circuit is enabled at a time point corresponding to the start of a sector on the storage medium.

9. The storage apparatus according to claim 1, wherein the head integrated circuit is included in the actuator.

10. The storage apparatus according to claim 1, further comprising a control circuit configured to receive a read signal from the head integrated circuit, send a write signal to the head integrated circuit, and send a heater-on signal and a set power level to the heater drive circuit.

11. A head integrated circuit for driving a head, the head including a head unit for reading a signal from a storage medium and a heating element for adjusting spacing between the head and the storage medium, the head integrated circuit comprising:
a read amplifier for amplifying a read signal from the head unit, and
a heater drive circuit for driving the heating element including:
a measuring circuit configured to measure level of power supplied to the heating element;
an error calculating circuit configured to calculate an error between a predetermined power level and the measured power level;
a pulse width modulation circuit configured to modulate the error into a pulse width; and
a switch configured to operate in response to a pulse from the pulse width modulation circuit and supply power to the heating element.

12. The head integrated circuit according to claim 11, further comprising a waveform blunting circuit connected to an output of the pulse width modulation circuit and configured to blunt the pulse waveform.

13. The head integrated circuit according to claim 12, wherein the waveform blunting circuit stops blunting the pulse waveform for a predetermined period when the heater drive circuit turns on the heating element.

14. The head integrated circuit according to claim 11, further comprising:
a power source connected to the switch; and
a power level control circuit configured to change a power level of the power source stepwise according to the measured power level.

15. The storage apparatus according to claim 14, wherein the power source is a current source.

16. The storage apparatus according to claim 14, wherein the power source is a voltage source.

17. The head integrated circuit according to claim 14, wherein the power source includes a plurality of power source elements; and
the power level control circuit is a selecting circuit configured to select an appropriate power source element from the plurality of power source elements according to the measured power level.

18. The head integrated circuit according to claim 11, wherein the heater drive circuit is enabled at a time point corresponding to the start of a sector on the storage medium.

19. The head integrated circuit according to claim 11, wherein the head integrated circuit is included in an actuator configured to drive the head.

20. The head integrated circuit according to claim 11, wherein the head integrated circuit is connected to a control circuit configured to receive a read signal from the head integrated circuit, send a write signal to the head integrated circuit, and send a heater-on signal and a set power level to the heater drive circuit.

* * * * *